United States Patent
Voves

(10) Patent No.: US 6,749,243 B2
(45) Date of Patent: Jun. 15, 2004

(54) DRIVE SYSTEM FOR A MOVABLE CROSSOVER BOX

(76) Inventor: Mark A. Voves, 24662 110$^{th}$ St., Cresco, IA (US) 52136

( * ) Notice: Subject to any disclaimer, the term of this patent is extended or adjusted under 35 U.S.C. 154(b) by 0 days.

(21) Appl. No.: 10/396,209

(22) Filed: Mar. 25, 2003

(65) Prior Publication Data

US 2003/0184110 A1 Oct. 2, 2003

Related U.S. Application Data

(60) Provisional application No. 60/368,845, filed on Mar. 29, 2002.

(51) Int. Cl.$^7$ ............................................... B62D 43/00
(52) U.S. Cl. ...................................... 296/37.6; 224/404
(58) Field of Search ......................... 296/37.6; 224/404, 224/548

(56) References Cited

U.S. PATENT DOCUMENTS

| | | | |
|---|---|---|---|
| 4,690,609 A | * 9/1987 | Brown | ....................... 296/37.6 |
| 4,995,663 A | * 2/1991 | Weaver et al. | ......... 296/100.11 |
| 5,524,953 A | * 6/1996 | Shaer | ..................... 296/100.12 |
| 6,142,554 A | * 11/2000 | Carroll et al. | ......... 296/100.11 |
| 6,276,735 B1 | * 8/2001 | Champion | .................. 296/37.6 |
| 6,315,346 B1 | * 11/2001 | Martin | ......................... 296/50 |
| 6,354,647 B1 | 3/2002 | Voves | |
| 6,626,479 B1 | * 9/2003 | Skoug | ........................ 296/37.6 |
| 2002/0113106 A1 | * 8/2002 | Cheney | ....................... 224/404 |

* cited by examiner

Primary Examiner—Lori L. Coletta

(57) ABSTRACT

A drive system for a movable crossover box includes a pair of pulleys located at the rearward side ends of the truck body; a pair of pulleys mounted at each of the upper front corners of the truck body, with a continuous strand of cable threaded around the pulleys so as to create an upper strand portion and a lower strand portion. A drive winch is operatively secured to the cable and is adapted to rotate in opposite directions at the selection of the operator so as to move the cable in one direction or the other. The crossover box is mounted for longitudinal movement on the upper portion of the truck body, and the box is affixed to one strand portion of the cable whereupon the box can be moved longitudinally forwardly or rearwardly on the truck body depending on the direction that the winch moves the cable.

8 Claims, 8 Drawing Sheets

DRIVE SYSTEM FOR A MOVABLE CROSSOVER BOX

CROSS REFERENCE TO RELATED APPLICATION

This application is a continuation of Provisional Application Ser. No. 60/368,845 filed Mar. 29, 2002.

BACKGROUND OF THE INVENTION

This invention relates to a drive system for a movable crossover box for pickup trucks and the like which is the subject of U.S. Pat. No. 6,354,647. While the crossover box of the '647 patent can be moved manually, and locked in various positions, the manual movement of the box is sometimes difficult by reason of the box being loaded very heavily.

It is therefore a principal object of this invention to provide a drive system for a movable crossover box that is electrically powered and which is economical of manufacture, and convenient to use.

BRIEF SUMMARY OF THE INVENTION

A drive system for a movable crossover box includes a pair of pulleys located at the rearward side ends of the truck body; a pair of pulleys mounted at each of the upper front corners of the truck body, with a continuous strand of cable threaded around the pulleys so as to create an upper strand portion and a lower strand portion. A drive winch is operatively secured to the cable and is adapted to rotate in opposite directions at the selection of the operator so as to move the cable in one direction or the other. The crossover box is mounted for longitudinal movement on the upper portion of the truck body in accordance with the '647 patent, and the box is affixed to one strand portion of the cable whereupon the box can be moved longitudinally forwardly or rearwardly on the truck body depending on the direction that the winch moves the cable.

The forwardly pairs of pulleys are laterally adjustable so as to accommodate truck bodies of different widths.

BRIEF DESCRIPTION OF THE DRAWINGS AND PHOTOS

The drawings and subject matter of U.S. Pat. No. 6,354,647 are herein incorporated by reference.

DESCRIPTION OF THE PREFERRED EMBODIMENTS

Figure 1:
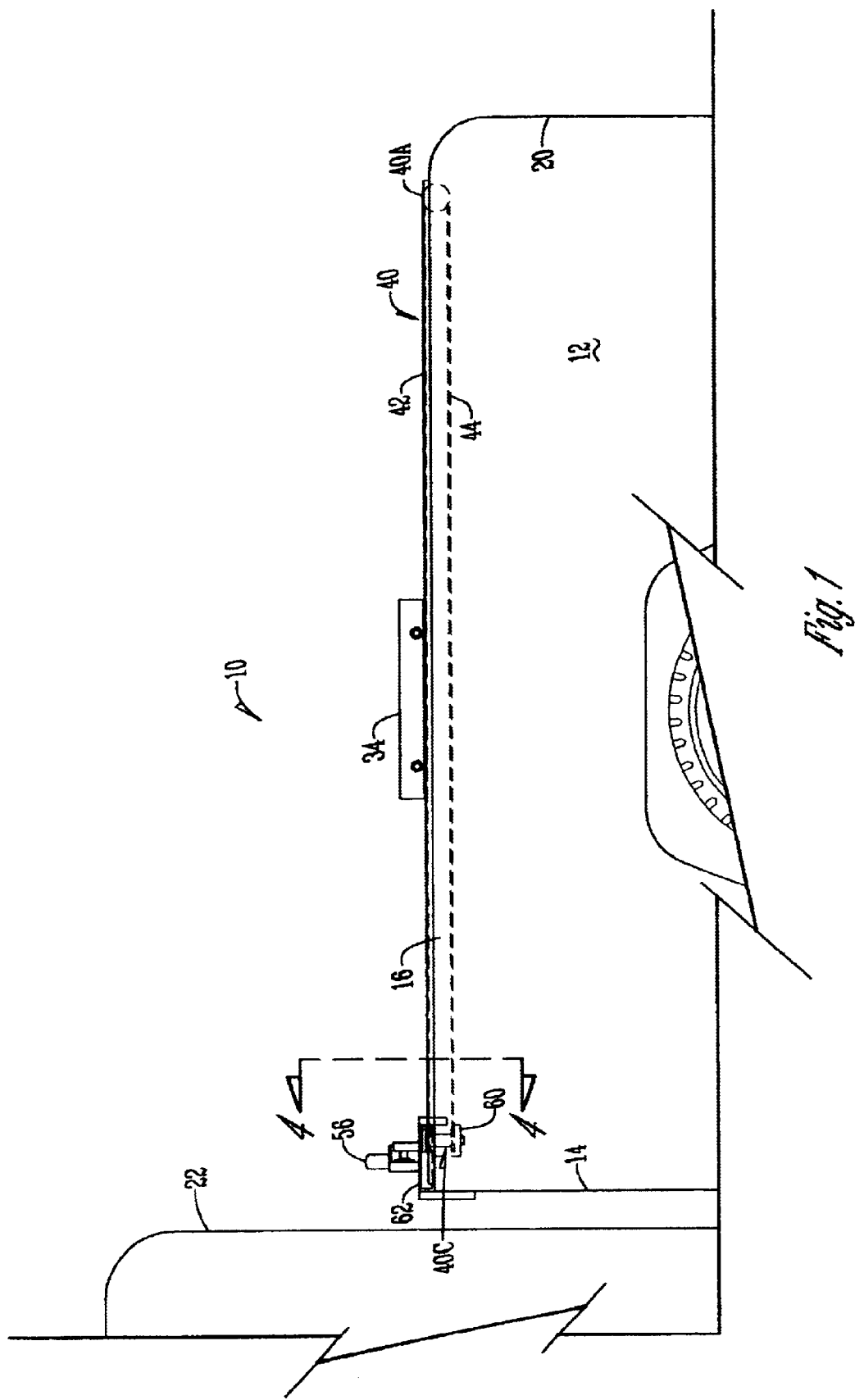
FIG. 1 is a side elevational view taken from the side of a pickup truck embodying the new invention without a box being attached.
Figure 5:
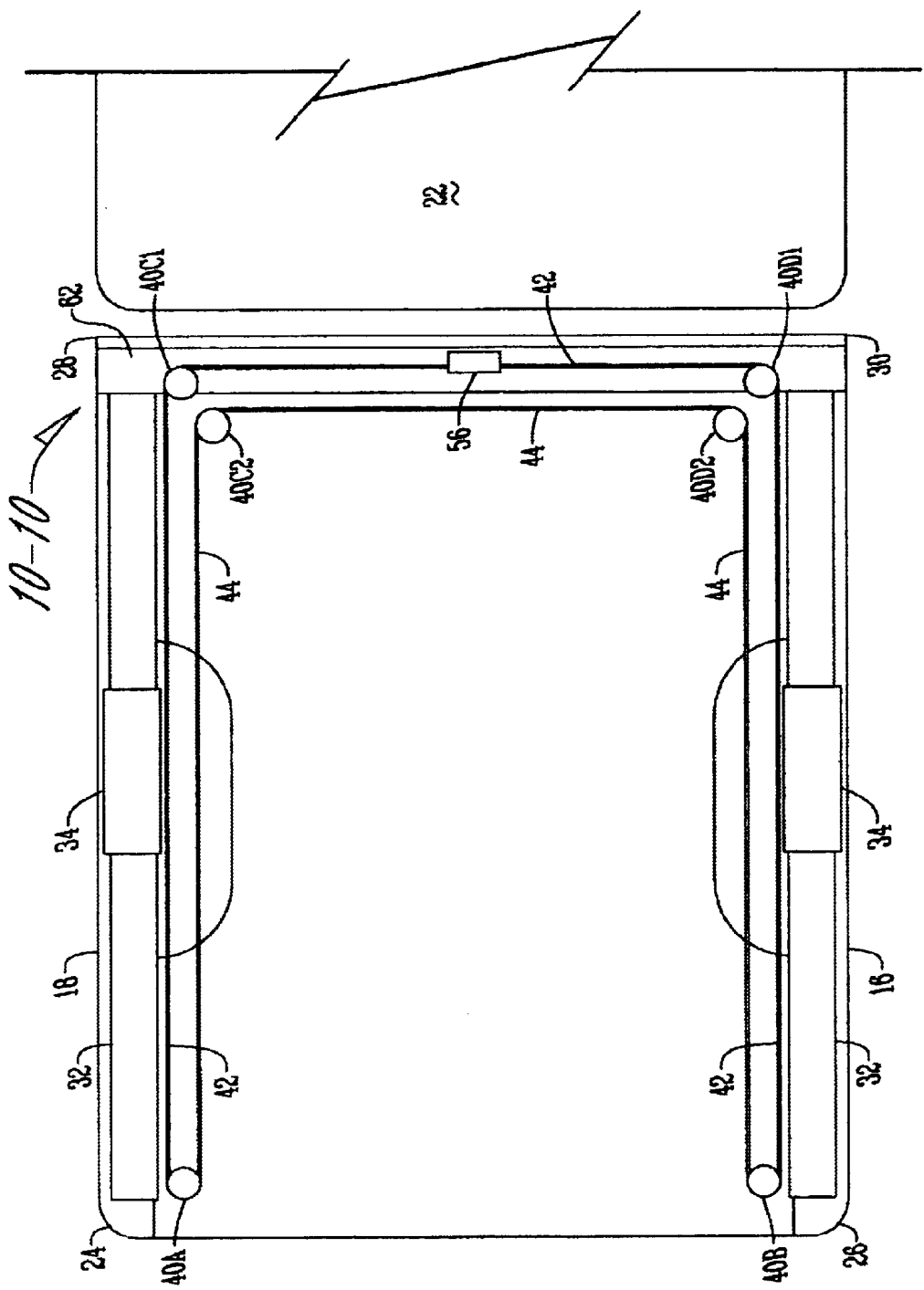
FIG. 5 is a schematic plan view of a pickup truck and the cable system of this invention mounted thereon.

With reference to FIG. 1, a truck 10 has a truck body 12 with a front 14, a right-hand side wall 16, a left-hand side wall 18, (FIG. 2) a rearward end 20 and a cab 22. The numeral 24 (FIG. 5) designates a left-hand rearward corner of body or box 12, a right-hand rearward corner 26, a left-hand forward corner 28 and right-hand forward corner 30.

Figure 2:
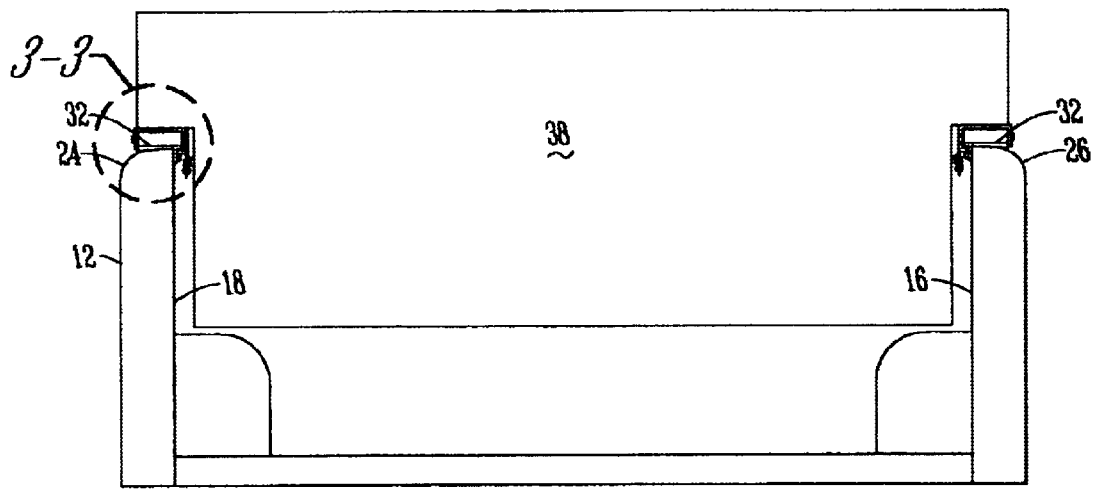
FIG. 2 is a rearward elevation of a pickup truck with a crossover box thereon utilizing this invention.
Figure 3:
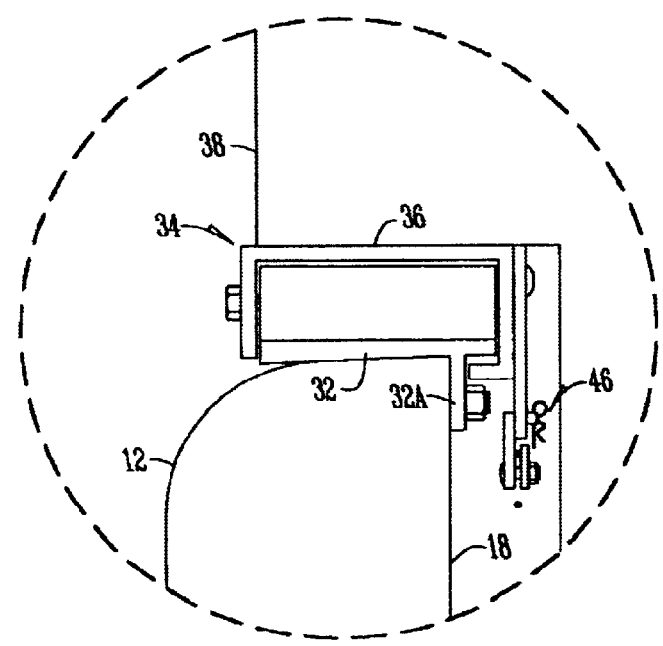
FIG. 3 is an enlarged scale sectional view taken on line 3—3 of FIG. 2.

With reference to FIGS. 2 and 3, a rail 32 is mounted on the top portion of side walls 16 and 18 in a manner similar to that shown in the '647 patent. A track assembly 34 (FIG. 3) is movably mounted on rail 32 which has a downwardly extending lip 32A. (FIG. 3) The track assembly 34 is rigidly secured to the bottom 36 of crossover box 38 as shown in FIG. 3.

Figure 6:
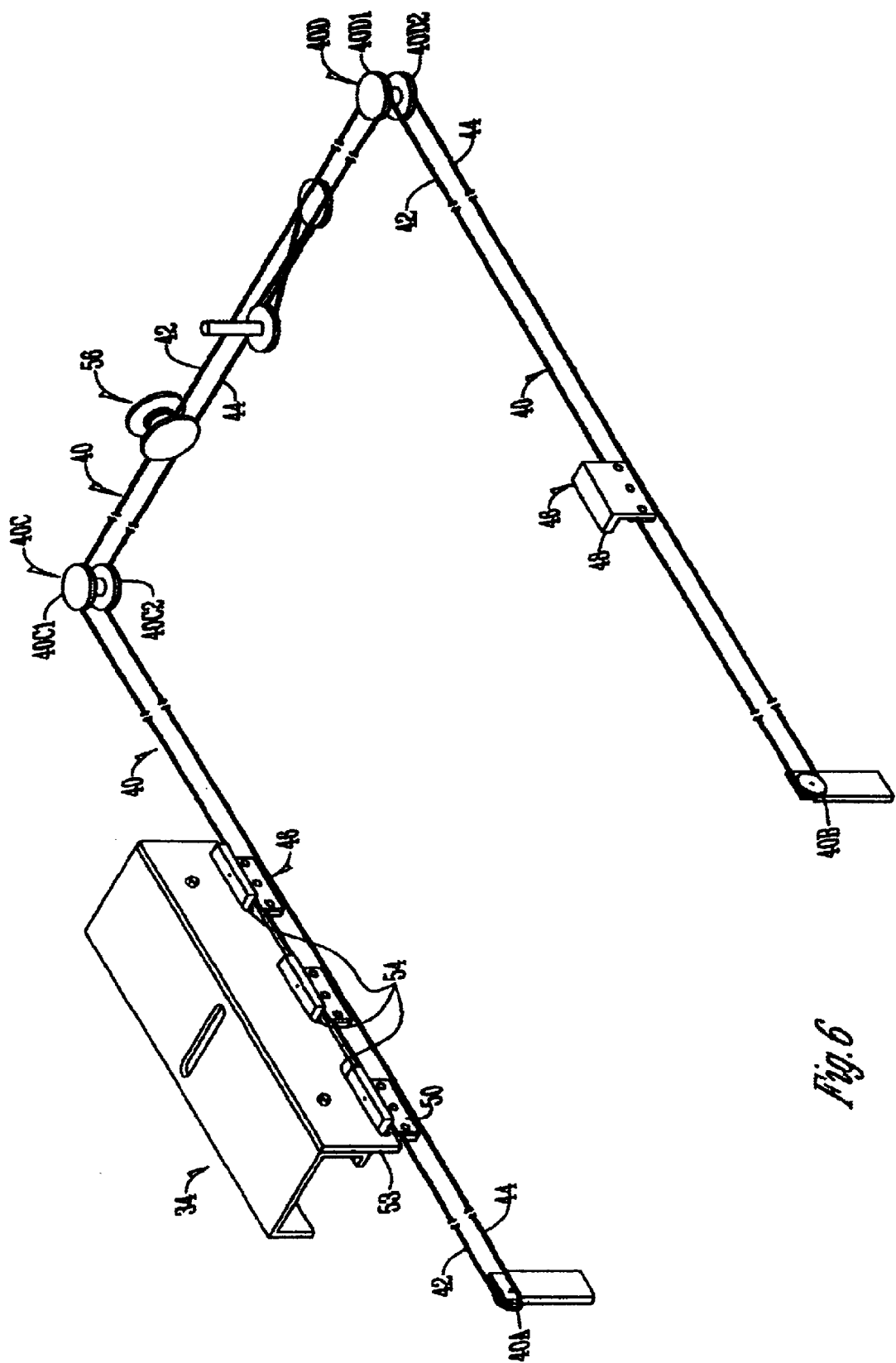
FIG. 6 is a perspective view of the cable system of this invention.

With reference to FIG. 6, an elongated continuous cable 40 has an upper strand 42 and a lower strand 44. The upper and lower strands crossover at winch 56 so that the lower cable then becomes the upper cable, and vice versa, so that the "upper strand" of cable 40 will always travel in the same direction along the sides of the body 12, with the "lower strand" of cable 40 and similarly travel in the same direction (but in an opposite direction to the direction of travel of the upper strand) at the sides of body 12. Rearward pulleys 40A and 40B are mounted at the rearward end 20 of the truck. A double pulley 40C has an upper pulley 40C1 and a separately rotatable lower pulley 40C2 located in the left-hand forward corner 28 of the bed. A double pulley 40D has an upper pulley 40D1 and a separately rotatable lower pulley 40D2 is located at the forward right-hand corner 30 of the bed 12.

Figure 3A:
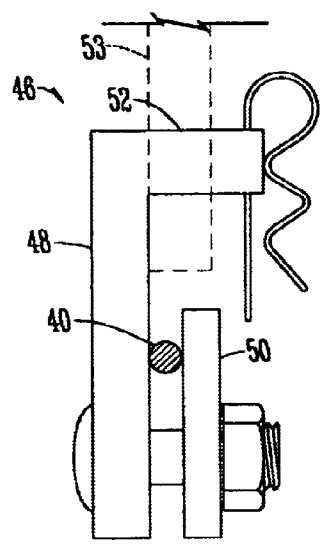
FIG. 3A is a large-scale elevational view through clip 46 of FIG. 3.
Figure 4:
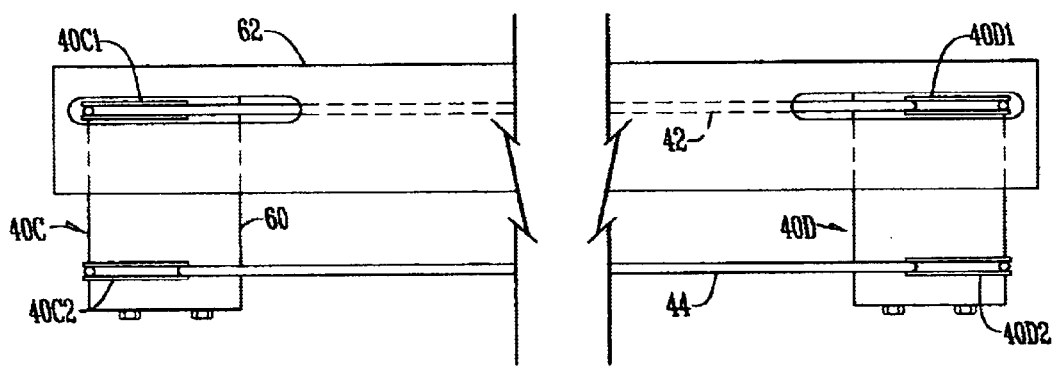
FIG. 4 is a large-scale broken elevational view taken on line 4—4 of FIG. 1.
Figure 9:
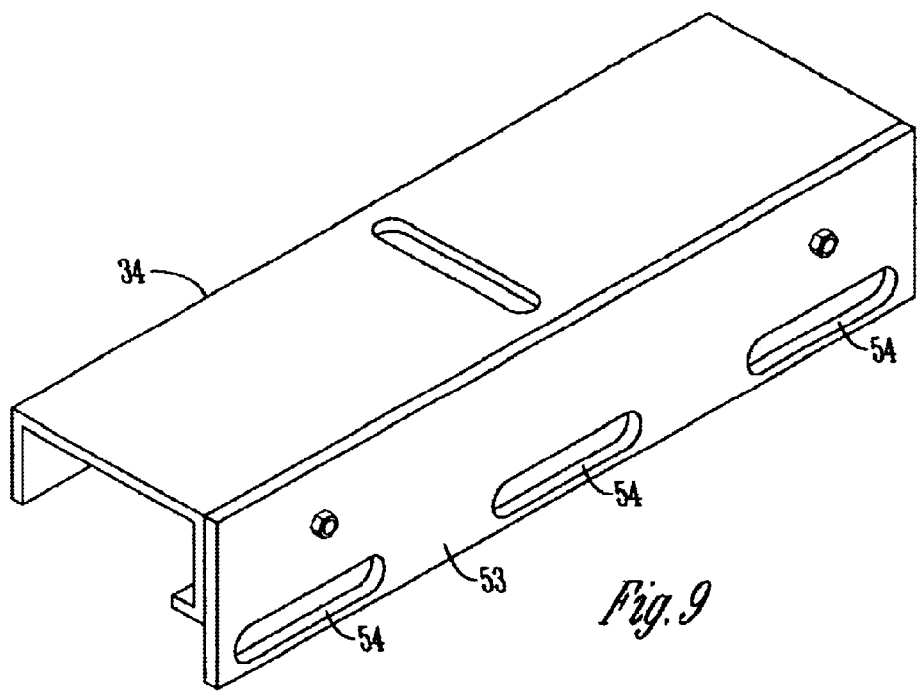
FIG. 9 is an upper perspective view of the box attachment assembly for the crossover box.

A clip 46 (FIGS. 3A and 6) is comprised of a short piece of angle iron 48 having a plate 50 secured thereto by screws or the like with the strand of cable 40 clinched therebetween. A horizontal flange 52 of angle iron 48 extends laterally outwardly therefrom and is received in any one of the elongated slots 54 of the plate 53 that is attached to track assembly 34 as shown in FIG. 9. See also FIGS. 3A and 6. Note that plate 53 extends below lip 32A on rail 32 and is inwardly spaced from side wall 18 (FIG. 3).

Figure 7:
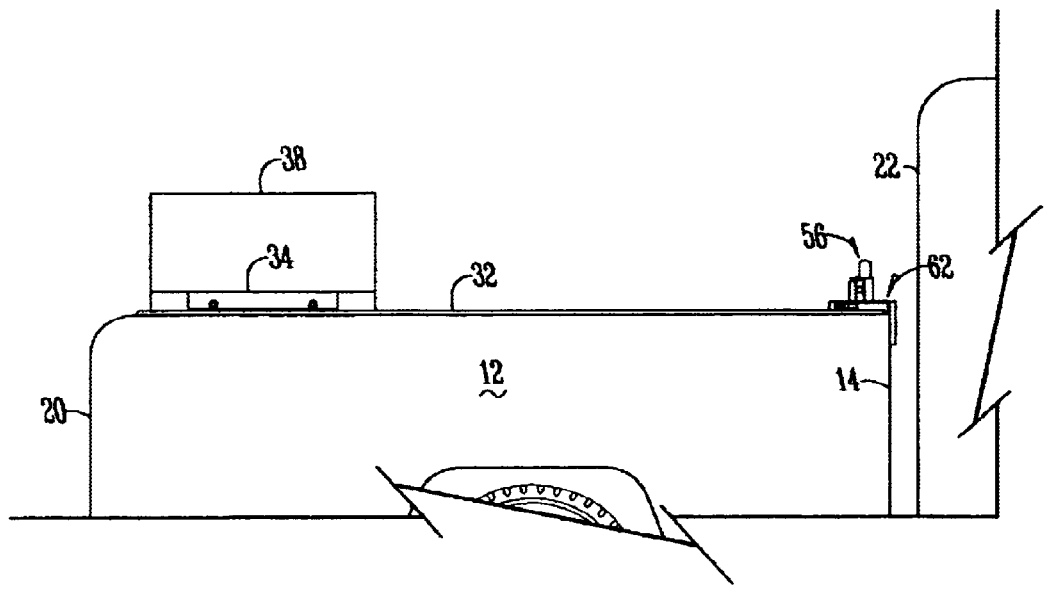
FIG. 7 is a side elevational view of a pickup truck with the crossover box in a rearward position.

A conventional electrical winch 56 (FIG. 7) connected to a battery or the like (not shown) is connected to cable 40 and has a reversible motor thereon. A conventional switch 57 (FIG. 11) is used to reverse the motor and to permit the winch to move the cable in either a forward or a rearward direction.

Figure 10:
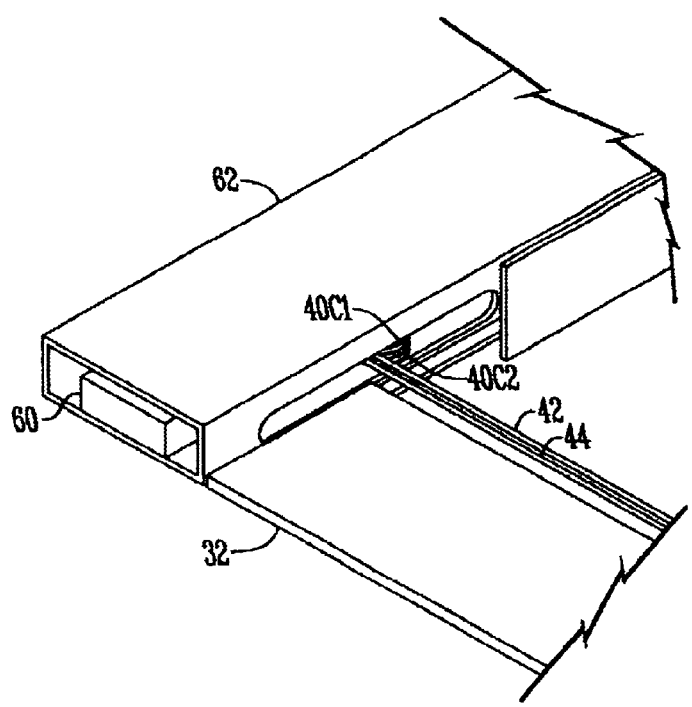
FIG. 10 is a perspective view showing a left-hand forward corner of the pick up truck bed as seen by the arrow 10—10 on FIG. 3.
Figure 11:
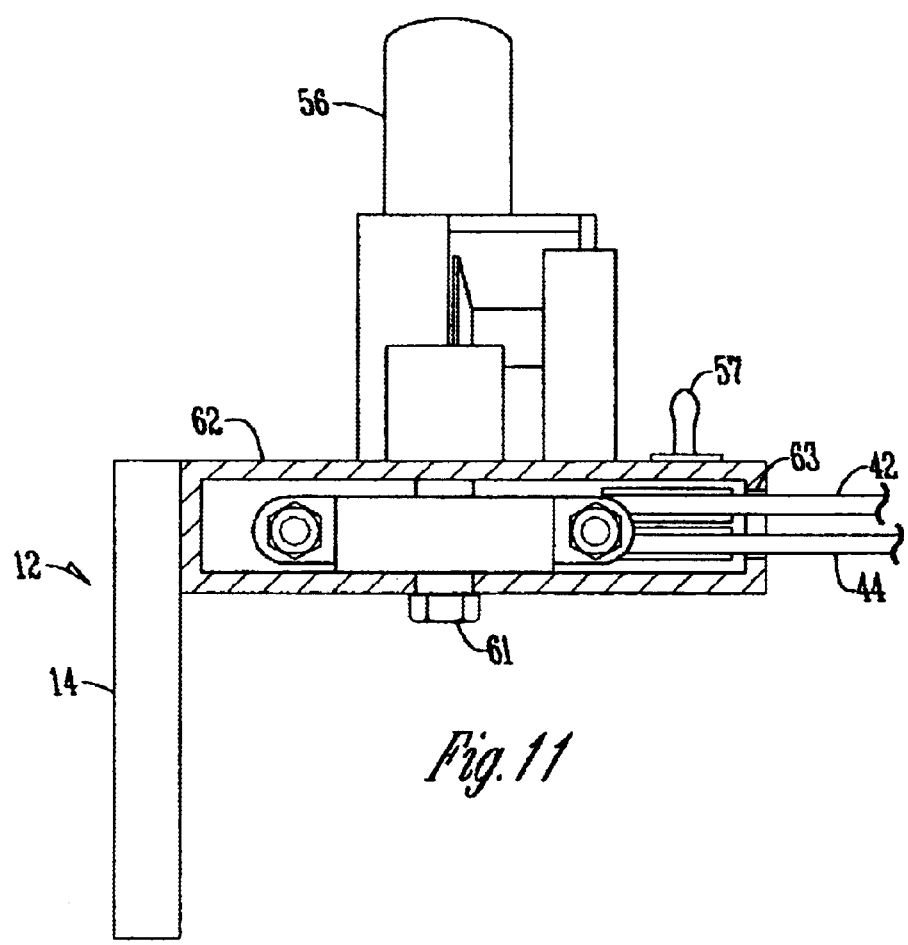
FIG. 11 is an end elevational view of the forward right-hand corner of the box showing the forward assembly and the winch.

A slidable block 60 via bolt 61 (FIG. 11) is mounted within housing 62 as shown in FIG. 10 and FIG. 11 so that the lateral position of the pulleys 40C and 40D can be laterally adjusted to accommodate the cable system to truck bodies of varying widths. Cables 42 and 44 exit housing 62 via slot 63 (FIG. 11).

Figure 8:
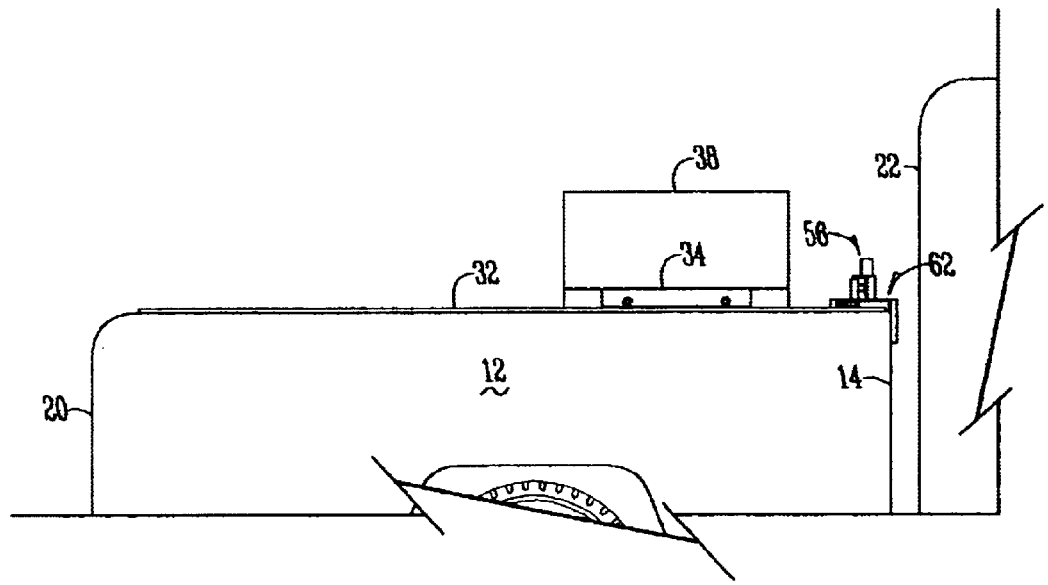
FIG. 8 is similar to FIG. 7 but shows the crossover box in a forward position.

By actuating the switch 57 shown in FIG. 11, the winch 56 can be used to move the cable 40 in one direction or another. The movement of the cable will permit the crossover box 38 to be moved from the position in FIG. 8 to the position of FIG. 7, and back again as the job may require.

The system can be adapted to truck bodies of varying widths by reason of the slidable block 60 mounted in rail 62. The tension on the cable can be adjusted by assembly 58.

It is therefore seen that this invention will achieve at least all of its stated objectives.

What is claimed is:

1. A drive system for a movable crossover box on the body of a pickup truck having a forward wall, with rearwardly extending side walls to form a truck box with upper forward corners and rearward corners, comprising:

a pulley system comprising a single first and second pulleys at each rearward corner mounted for rotation about a horizontal axis, a first and second pair of upper and lower pulleys at each forward corner for rotation about a vertical axis, a continuous cable threaded from the first pulley at one rearward corner to the upper pulley at one forward corner, and thence to the upper pulley at the other forward corner, and thence to and around the second pulley at other rearward corner, and thence to the lower pulley at the other forward corner, and thence to the lower pulley at the one forward corner, and thence back to and around the first pulley at one rearward corner, to form upper and lower strands of cable substantially parallel to each other throughout the pulley system, a crossover box extending laterally across upper portions of the side walls for longitudinal movement thereon, the crossover box being secured by its ends to the cable to one of the upper or lower strands of cable, and power means on the truck for selectively moving the cable in one of two directions to longitudinally move the crossover box in forward or rearward directions on the side walls of the truck box.

2. The drive system of claim 1 where adjustment means are provided for selectively moving the first and second pairs of pulleys in a lateral direction to be adapted to truck boxes of varying widths.

3. The drive system of claim 1 wherein means are provided for adjusting the tension on the cable.

4. The drive system of claim 1 wherein the crossover box is connected to the cable by a clip element on a track assembly secured to bottom ends of the box and secured to the cable.

5. The drive system of claim 1 wherein the power means is a winch around which the cable is encircled.

6. The drive system of claim 1 wherein a switch is provided to actuate the power means for selective movement of the cable in opposite directions.

7. The drive system of claim 1 wherein the rails are secured to upper portions of the side walls of the truck box, track assemblies are secured to the box and mounted on the rails, and the cable is connected to the track assemblies.

8. The drive system of claim 7 wherein a clip member secures the cable to the track assemblies.

* * * * *